United States Patent
Saunders

Patent Number: 5,909,649
Date of Patent: Jun. 1, 1999

[54] SPACE DIVISION MULTIPLE ACCESS RADIO COMMUNICATION SYSTEM AND METHOD FOR ALLOCATING CHANNELS THEREIN

[75] Inventor: Simon Saunders, Leveylsdene, United Kingdom

[73] Assignee: Motorola, Inc., Schaumburg, Ill.

[21] Appl. No.: 08/780,420

[22] Filed: Jan. 7, 1997

[30] Foreign Application Priority Data

Jan. 27, 1996 [GB] United Kingdom .................. 9601678

[51] Int. Cl.$^6$ .................................................. H04B 1/00
[52] U.S. Cl. ............................................ 455/450; 455/464
[58] Field of Search .................................. 455/450, 464, 455/509, 436, 440, 441, 442; 370/329, 330, 334

[56] References Cited

U.S. PATENT DOCUMENTS

| | | | |
|---|---|---|---|
| 5,515,378 | 5/1996 | Roy, III et al. | 455/450 |
| 5,566,209 | 10/1996 | Forssen et al. | 375/262 |
| 5,572,221 | 11/1996 | Marlevi et al. | 455/440 |
| 5,577,024 | 11/1996 | Malkamaki et al. | 370/335 |
| 5,615,409 | 3/1997 | Forssen et al. | 455/450 |
| 5,642,353 | 6/1997 | Roy, III et al. | 370/329 |

FOREIGN PATENT DOCUMENTS

| | | | |
|---|---|---|---|
| 2 309 616 | 1/1996 | United Kingdom | H04Q 7/38 |
| 9600484 | 1/1996 | WIPO | H04Q 7/38 |

OTHER PUBLICATIONS

Zetterberg, The Spectrum Efficiency of Base Station Antenna Array System for Spatially Selective Transmission, IEEE Transactions on Vehicular Technology, vol. 44, No. 3, Aug. 1995.

*Primary Examiner*—Nguyen Vo
*Assistant Examiner*—Makoto Aoki
*Attorney, Agent, or Firm*—Heather L. Creps

[57] ABSTRACT

In the preferred embodiment, a Space Division Multiple Access (SDMA) radio communication system (100) utilizes a base station (101) having a plurality of antenna elements (103) used to transmit and receive to multiple radio communication devices (107, 109) on a same frequency and time channel. A different set of beam forming weights is applied to communications for each radio communication device (107, 109) in such a way as to minimize the interference between the radio communication devices signals. A set of distance metrics is calculated utilizing the sets of weights for each pair of radio communication units sharing a channel. When any distant metric is less than a pre determined threshold value, one of the radio communication devices (107, 109) is reallocated to a new channel or a handover instruction is performed.

7 Claims, 3 Drawing Sheets

SPACE DIVISION MULTIPLE ACCESS RADIO COMMUNICATION SYSTEM AND METHOD FOR ALLOCATING CHANNELS THEREIN

FIELD OF THE INVENTION

The present invention generally relates to space division multiple access (SDMA) radio communication systems and more specifically to a method and apparatus for channel allocation within such a system.

BACKGROUND OF THE INVENTION

Generally, in Space Division Multiple Access (SDMA) systems, an antenna array is used to separate communication devices sharing a common frequency and time channel according to Spatial resolvability. In systems operated in a line of site or low scattering environment, this resolvability can be directly related to the angle of arrival of the various signals. In such an environment, standard techniques may be used to determine the angle of arrival of the various signals. A handover decision or channel reallocation for radio communication devices serviced by such a system is fairly straightforward; when the angle of arrivals of various communication devices are too close then a handover is performed.

In a highly scattering environment, an angle of arrival estimation becomes inaccurate and leads to very poor resolution. With poor resolution, a SDMA system can not accurately determine the location of communication devices, thus, fewer communication devices are allowed to use the same time and frequency channel i.e. lower channel capacity. Additionally, using an angle of arrival estimation in such an environment leads to inaccurate handover decisions. Thus, it would be advantageous to have an alternative criterion for performing handover or channel allocation in a SDMA system operating in a highly scattering environment.

SUMMARY OF THE INVENTION

A first aspect of the present invention encompasses a radio communication system utilising adaptive antennas, the radio communication system including a first base station for communicating with a plurality of communication devices, the radio communication system comprising: a first communication device communicating with the base station using a first channel, a second communication device communicating with the base station using the first channel, the base station characterized by: a set of antenna elements used for both transmitting and receiving radio frequency signals from the plurality of communication devices; a first set of weights for forming a first beam for communicating with the first communication device using the first channel; a second set of weight for forming a second beam for communicating with the second communication device using the first channel; a processor for calculating a set of distance metrics between the first communication device and the second communication device, wherein the distance metrics are based on the first and the second sets of weights; and a reallocating device, responsive to the processor, for reallocating channel assignments for the first and the second communication devices.

A second aspect of the present invention encompasses a method of allocating channel assignments between a plurality of communication devices in a radio communication system utilising adaptive antennas, the method characterized by the steps of: allocating a first communication channel and a first set of weights to a first communication device for communicating with a base station; allocating a first communication channel and a second set of weights to a second communication device for communicating with the base station; calculating a set of distance metrics between the first communication device and the second communication device, wherein the set of distance metrics are based on the first and the second sets of weights; and reallocating, responsive to said step of calculating, channel allocations for the first and the second communication device.

DETAILED DESCRIPTION OF A PREFERRED EMBODIMENT

In the preferred embodiment, a Space Division Multiple Access (SDMA) radio communication system utilises a base station having a plurality of antenna elements used to communicate with multiple radio communication devices on a same frequency and time channel. The plurality of antenna elements form a beam by applying a set of weights which are calculated by a beam forming algorithm on the basis of the received signals. When multiple mobiles are accommodated on the same channel, a different set of weights is applied for each radio communication device in such a way as to minimize the interference between the radio communication devices.

In a highly scattering environment, the standard technique of calculating the angle of arrival for determining handoff becomes extremely inaccurate. This inaccuracy is due to multiple scatterings from buildings, foliage and other clutter, leading to substantially uncorrelated fading at each antenna element.

In the preferred embodiment, a set of distance metrics is calculated utilizing the sets of weights assigned to each radio communication unit. Specifically, the distant metric calculation is performed between each pair of radio communication devices on the same channel.

The equation is $$d_{j,k} = \sqrt{\sum_{m=1}^{N} |W_{mj} - W_{mk}|^2}$$

where $d_{j,k}$ is the "distance" between communication devices j and k;

N is a number of antenna elements;

$W_{mj}$ is the mth weight for the communication device j.

A base station will regularly monitor these distances between each pair of mobiles. When any distant metric is less than a pre determined threshold value, one of the radio communication devices should be reallocated to a new channel or a handover instruction should be performed.

The choice of which radio communication device to reallocate is based on standard measurements such as signal strength and quality. If there are no other available channels, the system capacity has been exceeded and the call should be dropped. Utilizing the distance metrics based on the sets of weights will allow a far higher spatial capacity than a normal angle of arrival approach, since it intrinsically exploits the properties of scattering environments in decorrelating signals for mobiles which may be physically only slightly separated, but which nonetheless lead to large phase differences between elements.

Figure 1:
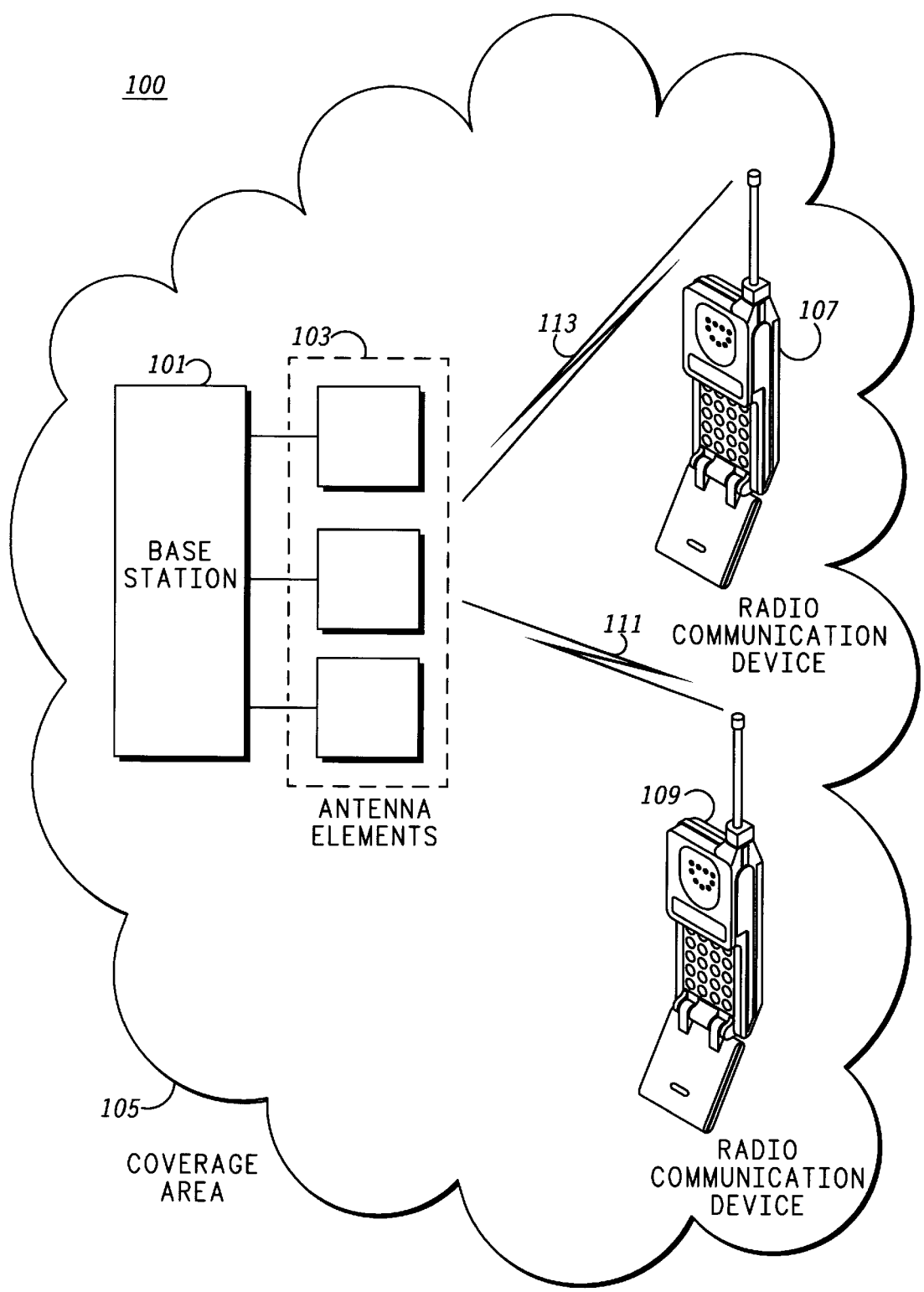
FIG. 1 is an illustration of a space division multiple access system that may be utilised in accordance with the present invention.

FIG. 1 is an illustration of a SDMA radio communication system including a base station 101 having a plurality of antenna elements 103 that provides radio services within a coverage area 105. The radio services that may be provided include voice, data, electronic mail and other data and or voice services currently available. The base station 101 provides this service to mobile and portable radio communication devices within the coverage area 105. Radio communication devices 107 and 109 are two such devices within the coverage area 105. In the preferred embodiment, the first radio communication device 107 is served by the base station 101 via communication channel 113. The second communication device 109 is served by the base station via communication channel 111. In the preferred embodiment, the radio communication channels 111, 113 have the same time and frequency allocation. Beam forming in the uplink and downlink between the base station and the multiple radio communication units allow multiple users in a cell to be allocated the same time and frequency channel. A more detailed description of the base station utilized in the radio communication system 100 is discussed with reference to FIG. 2.

Figure 2:
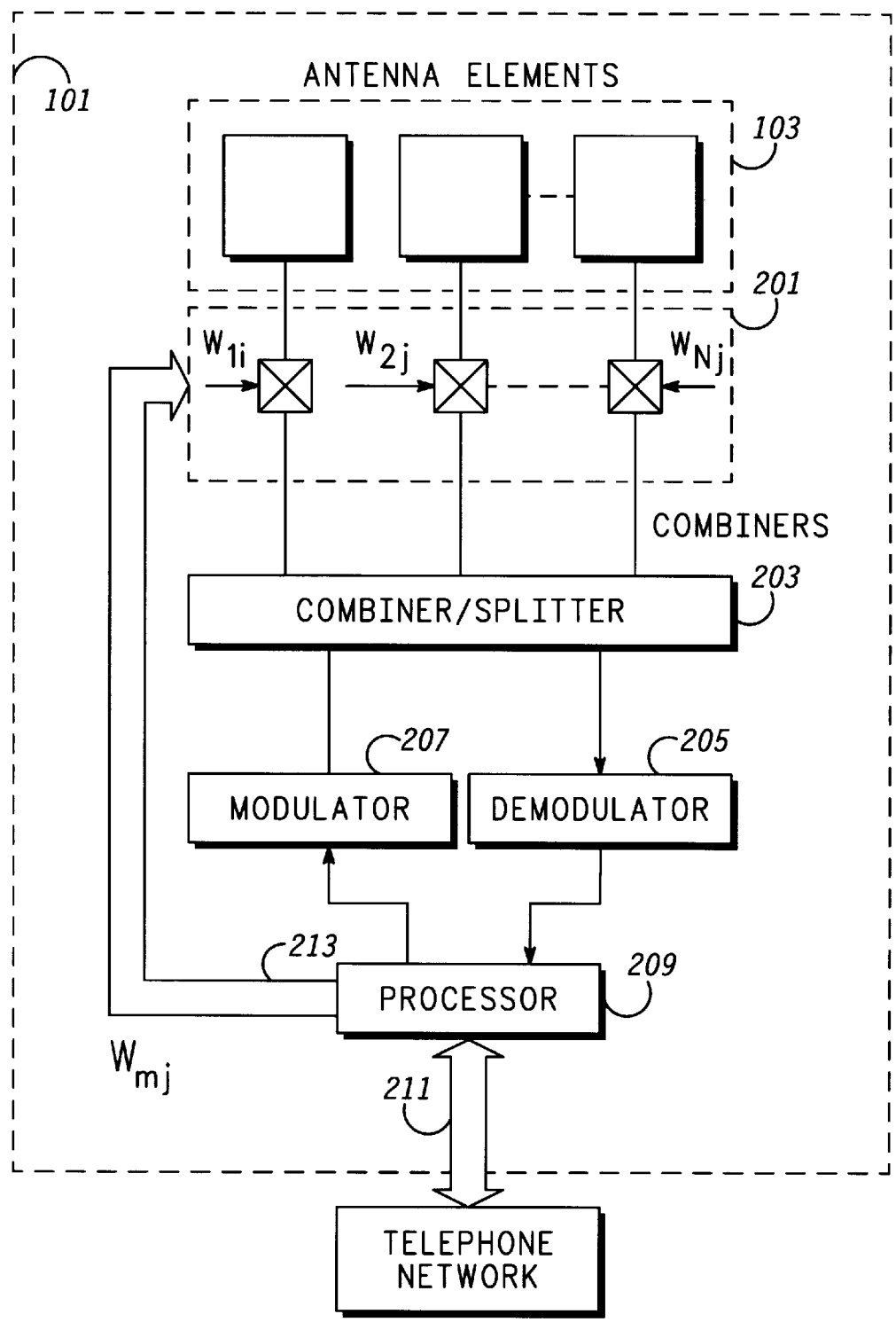
FIG. 2 is an illustration in block diagram form of a base station in accordance with the present invention.

FIG. 2 is an illustration in detailed block diagram form of the base station 101 of FIG. 1. The base station 101 includes a plurality of antenna elements 103, a plurality of combiners 201, a combiner/splitter 203, a demodulator 205, a modulator 207, a processor 209, and databus 211, 213.

Upon reception of radio frequency (RF) signals from a radio communication device, the base station 101 receives the RF signals at the plurality of antenna elements 103. Depending upon the physical location of each of the antenna elements. Each of the received signals is then combined with a complex set of weights chosen for each radio communication device. This combination is done in the plurality of combiners 201. The complex set of weights for each mobile is determined in the processor 209. Preferably, the selection of weights is determined using the Wiener combining method or an approximation of the Wiener combining method as is well known in the art. The Wiener solution maximises the Signal to Noise plus Interference Ratio (SINR). Once the received signals are combined with the weights, the combiner splitter 203 sums the resulting weighted signals into a single received signal that is input to the demodulator 205. The demodulator reduces the received weighted RF signal into a base band signal. The base band signal is then decoded and the resulting data is formatted into the proper telephone protocol in the processor 209. The formatted data is then output to a standard telephone network via a telephone trunking line 211.

Upon transmission of RF signals from the base station 101 to a radio communication device, i.e. downlink, the processor 209 receives telephone signals from a standard telephone network via the telephone trunking line 211. The processor then formats the received telephone signals into voice and or data symbols to be modulated in a known manner by modulator 207. The modulated symbols are then split to the plurality of antenna elements at the splitter 203. In the preferred embodiment, the splitter splits the signals equally among the N antenna elements available. Each of these modulated signals is then combined with a unique set of complex weights for the particular radio communication device. In principle, the downlink weights could be the same that were used on the uplink, however, modifications to these weights is preferable to accommodate the different time and frequency of the transmissions, as well as potential interference with neighbouring cells and other radio communication devices. The combiner 201 then outputs the weighted modulated telephone signals to the plurality of antenna elements 103 for transmission to the particular radio communication device.

Figure 3:
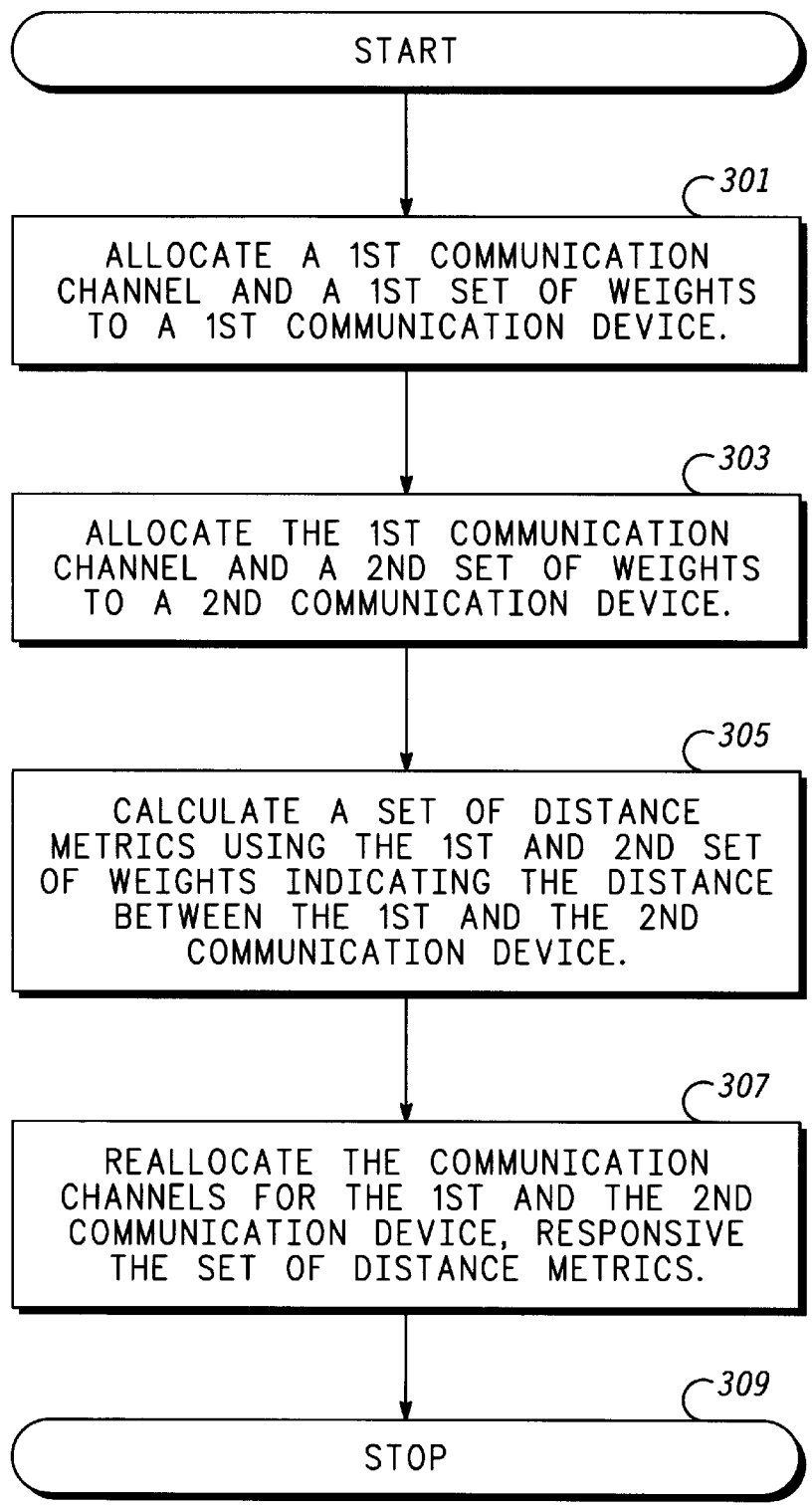
FIG. 3 is an illustration of a process flow in accordance with the present invention.

In addition to formatting data, the processor 209 allocates and reallocates communication devices to desired frequency and time channels in accordance with a desired method that is discussed in reference to FIG. 3. Additionally, the processor calculates the complex set of weights for each of the radio communication devices that fall within the coverage area 105 of the base station 101.

FIG. 3 is an illustration of a process flow 300 allocating channel assignments between the plurality of communication devices in a radio communication system such as a SDMA system. At function box 301, the process 300 allocates a first communication channel indicating a time and frequency and a first set of complex weights to a communication device. Upon receiving a random access burst from a radio communication device, the process determines a desired set of weights for receiving and transmitting to the communication device. Additionally, a communication channel is selected from a plurality of available communication channels. The selection of the communication channel may be performed by using the distance metrics as described below.

At function block 303, the process 300 allocates again the same communication channel as previously selected and a second set of unique weights for transmitting and receiving information to and from a second communication device. Because the preferred system is a space division multiple access system, the base station 101 has the capability of broadcasting to two or more communication devices on the same frequency and time communication channel.

At function block 305 a set of distanced metrics is calculated using the first and the second set of weights to indicate the distance between the first and the second communication device for assisting in the handover procedure. The distance calculated does not indicate the physical distance separating the two communication devices rather, it indicates the ability of the base station to separate electrically the first communication device from the second communication device. In a preferred embodiment the distance metric utilized is calculated using the equation $$d_{j,k} = \sqrt{\sum_{m=1}^{N} |W_{mj} - W_{mk}|^2}$$

where $d_{j,k}$ is the "distance" between communication devices j and k;

N is a number of antenna elements;

$W_{mj}$ is the mth weight for the communication device j. Preferably, the base station 101 and more particularly the processor 209 maintains a table indicating the distance metrics between each pair of radio communication devices sharing the same channel.

At function block 307, the process 300 re allocates the communication channels responsive to the sets of distance metrics that have been calculated in function block 305. Specifically, once the distance metric indicates that a mobile is no longer easily distinguishable from another mobile, a handover or re allocation of channel resources is carried out.

In the preferred embodiment, for each transmission and reception to a radio communication device a new set of weights is generated by the processor 209. For each new set of weights a distance metric is calculated between the new weights and the existing weights of the other radio communication devices allocated to the same channel. The set of resulting distance metrics are then compared to a pre determined threshold. In the preferred embodiment the pre determined threshold is chosen as a compromise of maximizing capacity and maintaining quality. The higher the threshold the higher the quality and the lower the threshold the more capacity. The preferred threshold is system dependent and based on extensive simulation and experimentation of the particular system. If the distance metric is less than the pre determined threshold, then one of the communication devices assigned to that channel is then re allocated to a second communication channel.

Alternatively, a linear predictive filter may be used with the weights and the distance metrics to calculate the trend of the distance metrics. The predictive distance metric could then be compared to a predetermined threshold, so that interference between communication devices may be further avoided. Although this would reduce the potential capacity of an SDMA system, the quality of the system would be improved. The linear predictive filter would be derived from any one of the known linear predictive filtering techniques.

The process 300 ends at the stop block 309.

When a new communication device enters the coverage area 105, the base station 101 must allocate a channel for communications between the communication device and the base station 101. Preferably, the radio communication device will transmit an initial random access burst. Upon reception of this initial random access burst at the base station 101, the processor 209 calculates a desired set of weights using a previously discussed known technique for that communication device. The processor 209 then calculates a set of distance metrics for all of the radio communication devices on each of the proposed communication channels. The processor 209 then determines which communication channel is most suitable for the new communication device based on the resulting distance metrics. Preferably, the processor 209 will select the communication channel which has the largest distance metric separation between the new communication device and those already communicating on that proposed channel.

In conclusion, by providing the distance metric calculations in accordance with the present invention, an SDMA system can provide reliable handovers and channel allocation in a highly scattering environment. The present invention no longer relies on the traditional angle of reception calculations for determining handover in the SDMA system. Thus, the preferred embodiment is not susceptible to the variances and inaccuracies due to angle of reception calculations in highly scattering environments. Instead the present invention relies solely on the chosen complex weights to calculate distance metrics and handover decisions.

What is claimed is:

1. A radio communication system utilizing adaptive antennas, the radio communication system including a first base station for communicating with a plurality of communication devices, the radio communication system comprising:

a first communication device communicating with the base station using a first channel;

a second communication device communicating with the base station using the first channel;

the base station comprising:

a set of antenna elements used for both transmitting and receiving radio frequency signals from the plurality of communication devices;

a first set of weights for forming a first beam for communicating with the first communication device using the first channel;

a second set of weights for forming a second beam for communicating with the second communication device using the first channel;

a processor for calculating a set of distance metrics between the first communication device and the second communication device, wherein the distance metrics are based on the first and the second sets of weights, and wherein the processor utilizes the following distance metric equation $$d_{j,k} = \sqrt{\sum_{m=1}^{N} |W_{mj} - W_{mk}|^2}$$

where $d_{j,k}$ is the "distance" between communication devices j and k, N is a number of antenna elements and $W_{mj}$ is the $m^{th}$ weight for the communication device j; and a reallocating device, responsive to the processor, for reallocating channel assignments for the first and second communication devices.

2. The radio communication system of claim 1 wherein the reallocating device further comprises a comparator for comparing said set of distance metrics to a threshold, if said set of distance metrics is less than the threshold, then reallocating the channel for at least the first communication device.

3. The radio communication system of claim 1 further comprising a linear predictive filter for calculating a trend for the set of distance metrics, wherein the trend for the set of distance metrics is used by the reallocating device.

4. A method of allocating channel assignments between a plurality of communication devices in a radio communication system utilizing adaptive antennas, the method comprising the steps of:

allocating a first communication channel and a first set of weights to a first communication device for communicating with a base station;

allocating a first communication channel and a second set of weights to a second communication device for communicating with the base station;

calculating a set of distance metrics between the first communication device and the second communication device, wherein the set of distance metrics are based on the first and the second sets of weights and wherein the step of calculating involves utilizing the following distance metric equation $$d_{j,k} = \sqrt{\sum_{m=1}^{N} |W_{mj} - W_{mk}|^2}$$

where $d_{j,k}$ is the "distance" between communication devices j and k, N is a number of antenna elements and $W_{mj}$ is the $m^{th}$ weight for the communication device j; and reallocating, responsive to said step of calculating, channel allocations for the first and the second communication device.

5. The method of claim 4 wherein the first step of allocating further comprises the steps of:

transmitting an initial random access burst from the first communication device;

receiving the initial random access burst at the base station;

calculating a desired set of weights for the first communication device;

calculating a set of distance metrics between the first communications device and the communications devices in a plurality of proposed communication channels; and allocating, responsive to said step of calculating, a communication channel for the first communication device.

6. The method of claim 4 wherein said step of reallocating further comprises comparing said set of distance metrics to a threshold, if said set of distance metrics less than the threshold, then reallocating the channel for at least the first communication device.

7. The method of claim 4 further comprising an intermediary step of predicting a trend for the set of distance metrics, wherein the trend for the set of distance metrics is used in the step of reallocating.

* * * * *